(12) United States Patent
Fröberg Olsson et al.

(10) Patent No.: US 10,868,599 B2
(45) Date of Patent: Dec. 15, 2020

(54) RADIO NODE AND METHOD THEREIN FOR DETERMINING PRECODERS

(71) Applicant: Telefonaktiebolaget LM Ericsson (publ), Stockholm (SE)

(72) Inventors: Jonas Fröberg Olsson, Ljungsbro (SE); Mirsad Cirkic, Linköping (SE); Sebastian Faxér, Järfälla (SE); Martin Hessler, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 19 days.

(21) Appl. No.: 16/327,071

(22) PCT Filed: Aug. 22, 2016

(86) PCT No.: PCT/SE2016/050775
§ 371 (c)(1),
(2) Date: Feb. 21, 2019

(87) PCT Pub. No.: WO2018/038648
PCT Pub. Date: Mar. 1, 2019

(65) Prior Publication Data
US 2019/0207661 A1    Jul. 4, 2019

(51) Int. Cl.
*H04B 7/06* (2006.01)
*H04L 5/00* (2006.01)
(Continued)

(52) U.S. Cl.
CPC ........... *H04B 7/0617* (2013.01); *H04B 7/024* (2013.01); *H04B 7/0619* (2013.01);
(Continued)

(58) Field of Classification Search
CPC .... H04B 7/0617; H04B 7/024; H04B 7/0619; H04B 7/0626; H04B 17/373;
(Continued)

(56) References Cited

U.S. PATENT DOCUMENTS

2009/0046800 A1* 2/2009 Xu .................. H04L 1/0001
375/267
2017/0311321 A1  10/2017 Kakishima et al.
(Continued)

FOREIGN PATENT DOCUMENTS

EP         3244549 A1    11/2017
KR    20160058716 A     5/2016
(Continued)

OTHER PUBLICATIONS

Unknown, Author, "CSI feedback for NR MIMO", 3GPP TSG RAN WG1 Meeting #86, R1-166479, Gothenburg, Sweden, Aug. 22-26, 2016, pp. 1-4.
(Continued)

*Primary Examiner* — Andrew Lai
*Assistant Examiner* — Harry H Kim
(74) *Attorney, Agent, or Firm* — Sage Patent Group (57) ABSTRACT

A method performed by a first radio node for determining one or more precoders for beamforming of reference signals is provided. The reference signals relate to Channel State Information, CSI, of a forward link channel from the first radio node to a second radio node. The first radio node receives (201) reverse link reference signals from the second radio node and estimates (202) a first quality value of the forward link channel based on the received reverse link reference signal. The first radio node then determines (203) one or more first precoders of respective one or more first ranks based on the reverse link reference signal and the estimated first quality value. When the one or more first precoders have been determined, the first radio node triggers (204) a first transmission of one or more first forward link reference signals to the second radio node. The one or more first forward link reference signals are beamformed according to the determined respective one or more first precoders.

13 Claims, 4 Drawing Sheets

(51) Int. Cl.
*H04B 7/024* (2017.01)
*H04B 17/373* (2015.01)
*H04B 7/0456* (2017.01)
*H04L 25/02* (2006.01)

(52) U.S. Cl.
CPC ......... *H04B 7/0626* (2013.01); *H04B 17/373* (2015.01); *H04L 5/005* (2013.01); *H04L 5/0023* (2013.01); *H04L 5/0057* (2013.01); H04B 7/0486 (2013.01); H04L 25/0204 (2013.01); H04L 25/0224 (2013.01); H04L 25/0226 (2013.01)

(58) Field of Classification Search
CPC ... H04B 7/0486; H04L 5/0023; H04L 5/0057; H04L 5/005; H04L 25/0204; H04L 25/0226; H04L 25/0224
See application file for complete search history.

(56) References Cited

U.S. PATENT DOCUMENTS

| | | | |
|---|---|---|---|
| 2018/0331746 A1* | 11/2018 | Okuyama | H04W 72/046 |
| 2019/0028254 A1 | 1/2019 | Nam et al. | |
| 2019/0159217 A1* | 5/2019 | Gao | H04B 7/26 |
| 2019/0245595 A1* | 8/2019 | Xu | H04B 7/063 |

FOREIGN PATENT DOCUMENTS

| | | |
|---|---|---|
| WO | 2016047409 A1 | 3/2016 |
| WO | 2016111521 A1 | 7/2016 |

OTHER PUBLICATIONS

Unknown, Author, "Discussion on beam training", 3GPP TSG RAN WG1 Meeting #86, R1-166480, Gothenburg, Sweden, Aug. 22-26, 2016, pp. 1-4.

Unknown, Author, "MIMO transmission schemes for NR", 3GPP TSG RAN WG1 Meeting #86, R1-166478, Gothenburg, Sweden, Aug. 22-26, 2016, pp. 1-6.

Unknown, Author, "Reference Signals and Procedures for CSI Acquisition", 3GPP TSG-RAN WG1 #86, R1-166381, Gothenburg, Sweden, Aug. 22-26, 2016, pp. 1-5.

Unknown, Author, "Remaining details of SRS procedures for eLAA", 3GPP TSG RAN WG1 #86, R1-166254, Gothenburg, Sweden, Aug. 22-26, 2016, pp. 1-2.

Unknown, Author, "Views on NR MIMO design", 3GPP TSG RAN WG1 Meeting #85, R1-164254, CATT, Nanjing, China, May 23-27, 2016, pp. 1-4.

* cited by examiner

RADIO NODE AND METHOD THEREIN FOR DETERMINING PRECODERS

TECHNICAL FIELD

Embodiments herein relate to a radio node and a method therein. In particular, they relate to determining one or more precoders for beamforming of reference signals.

BACKGROUND

In a typical wireless communication network, wireless devices, also known as wireless communication devices, mobile stations, stations (STA) and/or user equipments (UE), communicate via a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted for example a NodeB or an eNodeB. A service area or cell area is a geographical area where radio coverage is provided by the radio network node. The radio network node communicates over an air interface operating on radio frequencies with the wireless device within range of the radio network node.

A Universal Mobile Telecommunications System (UMTS) is a third generation (3G) telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques can significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO systems.

Future access technologies are expected to support a large amount of transmit antennas, and especially on the network side. In the context of Massive MIMO, as an example, the number of antennas is expected to be huge, where a single transmission point may have in the order of several hundreds or even thousands of antenna elements. A large, albeit much smaller, number of antennas may potentially be expected also in the UE at the high carrier frequencies, since the physical size of the antenna elements at those frequencies may be made very small.

This increased number of antenna elements, makes it possible to form more directive antenna patterns as compared to what is possible with the older antenna systems of today. The more capable system can focus its transmitted and/or received signal much more efficiently towards the UE being served, whilst suppressing the interference from/to other UEs. Each such direction is typically referred to as a 'beam', whereas the entire process is referred to as 'beamforming'.

For the LTE standard, 3GPP has introduced the Channel State Information (CSI)-Reference Signals (RS) for CSI acquisition for up to 8 antenna ports, e.g. in Release 11. Further, up to 16 antenna ports e.g. in 3GPP Release 13 and in the coming 3GPP Release 14 up to 32 antenna ports. This enables UEs to evaluate a channel between the eNB and the UE for up to 8 transmit antennas on the eNB side. The UE evaluates the channel and reports CSI comprising a Precoder Matrix Indicator (PMI), Rank Indicator (RI) and Channel Quality Indicator (CQI). The PMI represents a beam since the precoder matrix will steer the energy in a direction suitable for the UE. 3GPP is currently studying extensions of this type CSI reporting scheme to larger number of antenna ports which in turn need extensions to the CSI-RS definition. To enable channel estimation, a number of resource elements are required per antenna port for transmission of the reference signals. This means that extending the number of ports and antennas will consume more downlink resources.

The main advantage of Time Division Duplex (TDD) systems compared to Frequency-Division Duplex (FDD) systems is the possibility to exploit channel reciprocity. If channel reciprocity holds, both transmission links match exactly. Then, the channel estimate of the uplink direction at the transmitter can directly be utilized for link adaptation in the downlink.

In FDD wherein channel reciprocity cannot be fully used, techniques such as grid-of-beam, differential beamforming and full-dimension CSI feedback have been discussed to acquire beam and channel knowledge on the eNB side.

For the grid-of-beam a large set of possible beams are transmitted using beamformed reference signals. The UE scans through the possible beams and reports back to the eNB a number of candidate beams suitable to use.

Differential beamforming is a technique to gradually optimize beamforming to the UE. The eNB initially uses a wide beam to the UE and the UE then measures and reports back CSI to the eNB, which in turn updates the beamforming to a narrower beam to the UE.

Full-dimension CSI feedback is an extension of standard CSI acquisition techniques for larger number of antennas and more fine-grained CSI feedback. The reference signals for CSI, e.g. CSI-RS, have full dimension with respect to number of antennas and the UE can measure on the full channel between transmit and its receive antennas. The UE then may transmit traditional Rank Indicator (RI), Channel Quality Indicator (CQI), and Pre-coding Matrix Indicator (PMI) report or may transmit a more or less explicit CSI report, e.g. quantified channel matrix, quantified singular-vectors and/or singular values.

The existing solutions have a number of drawbacks:

They are all more or less costly in terms downlink resource consumption and more or less computationally heavy for the UE.

The grid of beam solution transmits many beams where only a small fraction of the beams will be a candidate beam for the UE.

Differential beamforming requires several assisting beamformed reference signals. These assisting beams are used for maintenance of the optimized beam. This means that the UE needs to produce several CSI reports which increases the efforts required by the UE.

Full-dimension CSI feedback will consume a lot of downlink resources if the number of transmit antennas is large. The codebook of possible precoders also needs to be large which means that the UE needs to evaluate a large number of precoders in order to produce a CSI report. An explicit CSI report has the additional drawback that more uplink resources are needed to actually send the CSI report.

At least differential beamforming suffers from that it takes time to acquire an optimized beamforming.

SUMMARY

It is therefore an object of embodiments herein to further improve the performance of a wireless communications network wherein operating radio nodes use a large number of antennas.

According to a first aspect of embodiments herein, the object is achieved by a method performed by a first radio node for determining one or more precoders for beamforming of reference signals. The reference signals relate to Channel State Information, CSI, of a forward link channel from the first radio node to a second radio node. The first radio node receives reverse link reference signals from the second radio node. The first radio node estimates a first quality value of the forward link channel based on the received reverse link reference signal. The first radio node then determines one or more first precoders of respective one or more first ranks based on the reverse link reference signal and the estimated first quality value. When the one or more first precoders have been determined, the first radio node triggers a first transmission of one or more first forward link reference signals to the second radio node. The one or more first forward link reference signals are beamformed according to the determined respective one or more first precoders.

According to a second aspect of embodiments herein, the object is achieved by a first radio node for determining one or more precoders for beamforming of reference signals. The reference signals are adapted to relate to Channel State Information, CSI, of a forward link channel from the first radio node to a second radio node. The first radio node being configured to:

receive reverse link reference signals from the second radio node, estimate a first quality value of the forward link channel based on the received reverse link reference signal, determine one or more first precoders of respective one or more first ranks based on the reverse link reference signal and the estimated first quality value, and trigger a first transmission of one or more first forward link reference signals to the second radio node, which one or more first forward link reference signals are to be beamformed according to the determined respective one or more first precoders.

Since the first quality value of the forward link channel is estimated based on the received reverse link reference signal, the first radio node can determine one or more first precoders of respective one or more first ranks based on the reverse link reference signal and the estimated first quality value. This is efficient since the determining of the first precoder does not rely on channel quality feedback from the second radio node, i.e. radio resources are saved. In cases when the quality value is high, a lower determined rank of the precoder may be selected that consume less radio resources on the forward link than if the determined rank is high.

This in turn results in that the performance of the wireless communications network wherein operating radio nodes use a large number of antennas, is further improved.

An advantage with embodiments herein is that lower overhead in forward link is utilized for forward link reference signals resulting in that beamforming can be determined faster. This is since the first precoder does not rely on channel quality feedback from second radio node, and thereby legacy UEs that do not support reporting full-dimension precoders may still benefit from larger number of transmit antennas of the first radio node.

BRIEF DESCRIPTION OF THE DRAWINGS

Examples of embodiments herein are described in more detail with reference to attached drawings in which.

DETAILED DESCRIPTION

Embodiments herein relate to determining one or more precoders for beamforming of reference signals in a wireless communication network.

Figure 1:
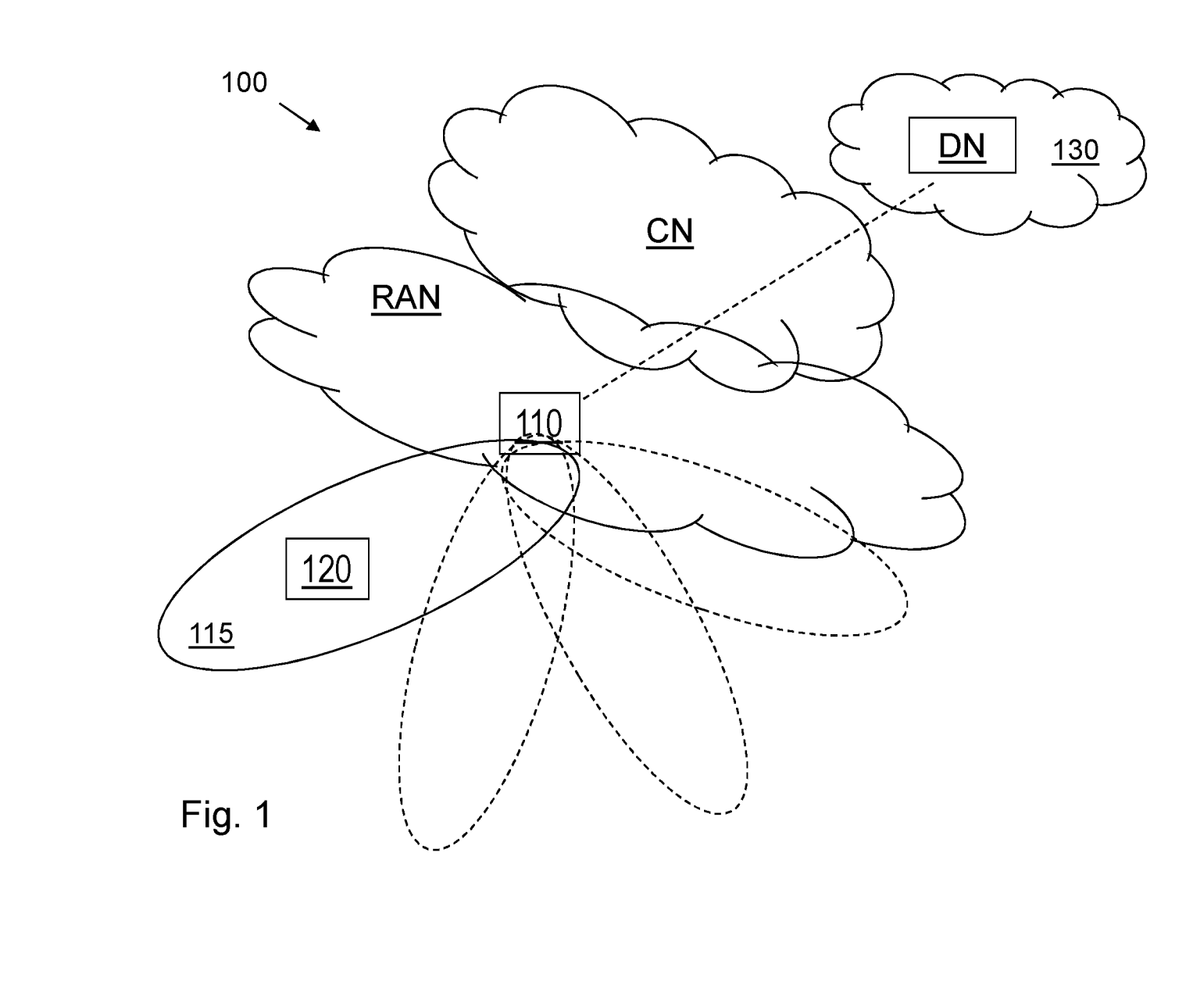
FIG. 1 is a schematic block diagram illustrating embodiments of a communications network.

FIG. 1 is a schematic overview depicting a wireless communication network 100 in which embodiments herein may be implemented. The wireless communication network 100 comprises one or more RANs and one or more CNs. The wireless communication network 100 may use a number of different technologies, such as Wi-Fi, Long Term Evolution (LTE), LTE-Advanced, 5G, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are also applicable in further development of the existing wireless communication systems such as e.g. WCDMA and LTE.

A first radio node 110 operates in the wireless communication network 100. The first radio node 110 providing radio coverage over a geographical area, such as a service area 115, which may also be referred to as a beam or a beam group of a radio access technology (RAT), such as 5G, LTE, Wi-Fi or similar. The first radio node 110 may be a transmission and reception point e.g. a radio access network node such as a Wireless Local Area Network (WLAN) access point or an Access Point Station (AP STA), an access controller, a base station, e.g. a radio base station such as a NodeB, an evolved Node B (eNB, eNode B), a base transceiver station, a radio remote unit, an Access Point Base Station, a base station router, a transmission arrangement of a radio base station, a stand-alone access point or any other network unit capable of communicating with a wireless device within the service area served by the first radio node 110 depending e.g. on the first radio access technology and terminology used. The first radio node 110 may be referred to as a serving radio network node and communicates with a second radio node 120, which may be a UE, with Downlink (DL) transmissions to a second radio node 120 and Uplink (UL) transmissions from the second radio node 120.

In the wireless communication network 100, radio nodes such as e.g. the second radio node 120 which may be a UE, mobile station, a non-access point (non-AP) STA, a STA, a user equipment and/or a wireless terminals, communicate via one or more Access Networks (AN), e.g. RAN, to one or more core networks (CN). It should be understood by the skilled in the art that "UE" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a small base station communicating within a cell area.

Embodiments herein may be implemented in any one out of a base station and a UE. Therefore in some first embodiments which most of the examples herein relate to and which are depicted in FIG. 1, the first radio node 110 is a base station and the second radio node 120 is a UE, but it may as well be the other way around in some second embodiments, wherein the first radio node 110 is a UE and the second radio node 120 is a base station. As of today, UEs with multiple transmitters that are able to do beamforming in the UL is not common. That will change for 5G UEs where UL beamforming in the UE will be more common.

In both the first and second embodiments, the first radio node 110 communicates with the second radio node 120 with forward link transmissions to the second radio node 120 and reverse link transmissions from the second radio node 120.

Some embodiments herein provide a way of determining CSI procedure.

An embodiment according to an example scenario comprises a method for determining a beamforming of CSI-RS assisted by a reverse link such as e.g. an UL reference signal transmission. In these embodiments, a first CSI-RS precoder is determined based on an uplink reference signal and a determined quality value of the said uplink reference signal, where the number of CSI-RS antenna ports, or equivalently, the rank of the CSI-RS precoder, is selected based on the determined quality value. A first beamformed transmission, using the first precoder, of reference signals for CSI is then triggered.

A method for determining one or more precoders for beamforming of reference signals is performed by the first radio node 110. As an alternative, a Distributed Node (DN) and functionality, e.g. comprised in a cloud 130 as shown in FIG. 1, may be used for performing or partly performing the method.

Figure 2:
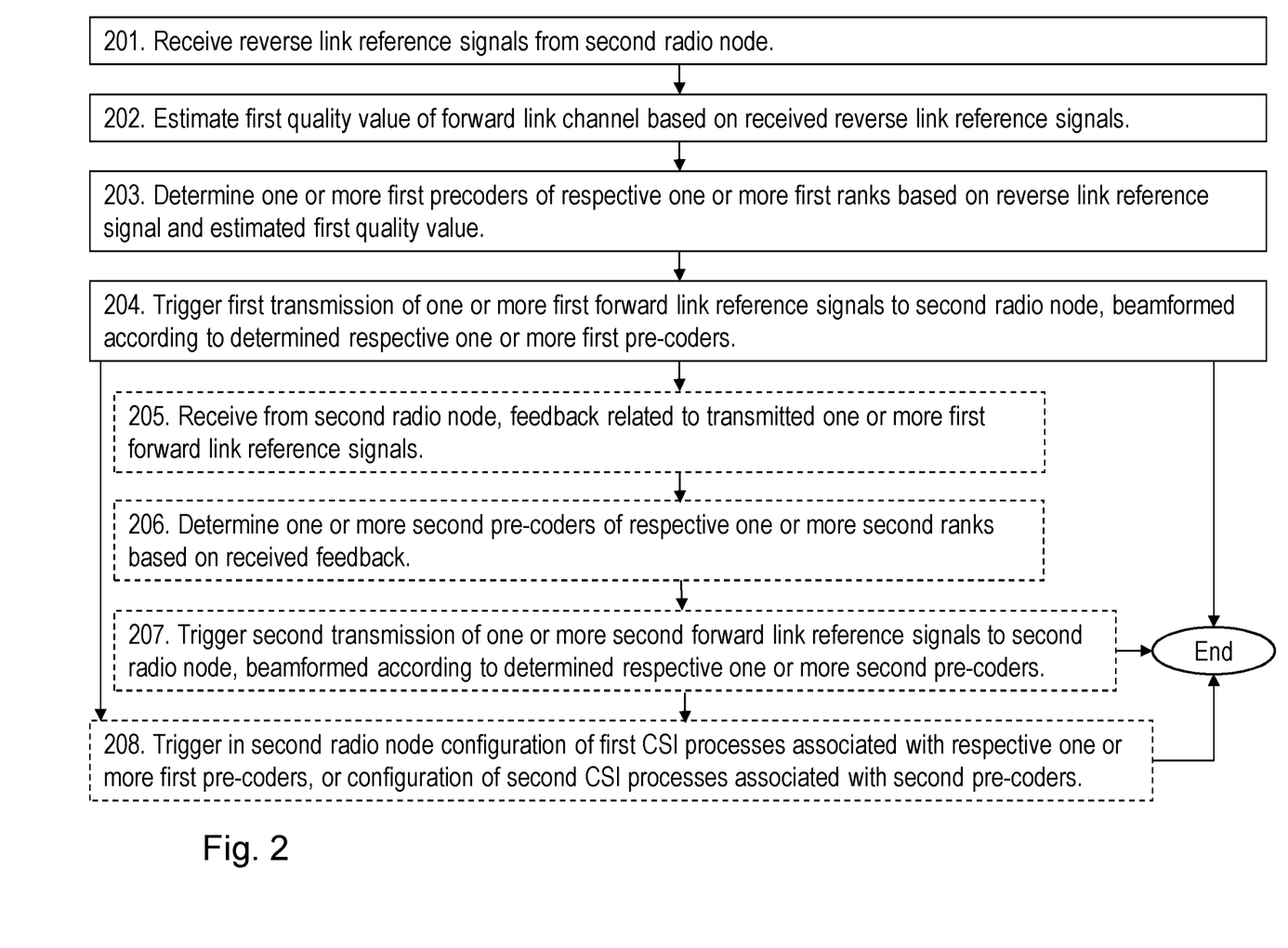
FIG. 2 is a flowchart depicting embodiments of a method in a first radio node.
Figure 3:
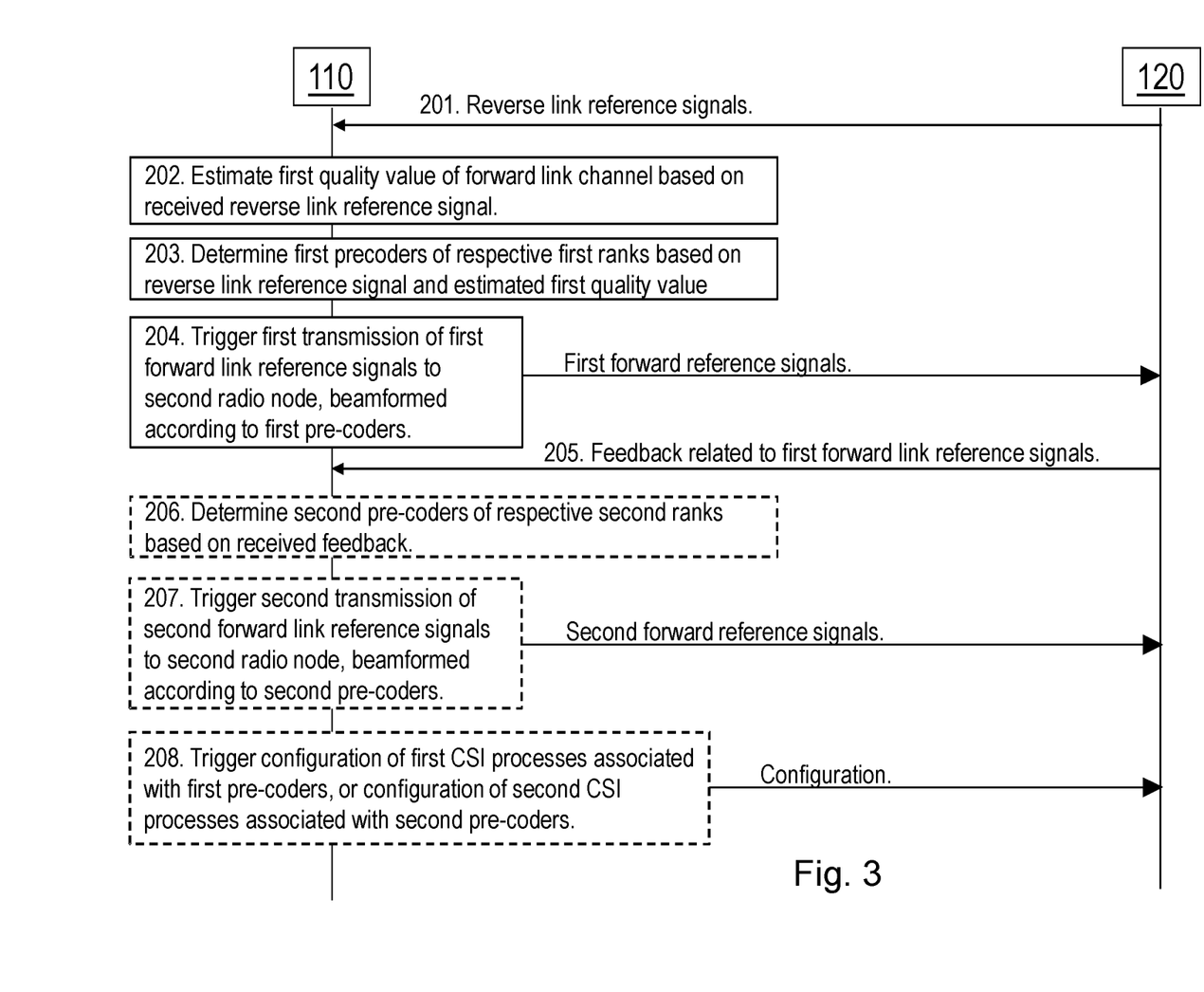
FIG. 3 is a sequence diagram depicting embodiments of a method in a first radio node.

Example embodiments of a method performed by the first radio node 110 determining one or more precoders for beamforming of reference signals will be described in a general way with reference to a flowchart depicted in FIG. 2 and in parallel with reference to a signalling diagram depicted in FIG. 3. After this a more detailed explanation and exemplification follows.

As mentioned above the reference signals relate to CSI of a forward link DL channel from the first radio node 110 to a second radio node 120. The forward link is a DL when the first radio node 110 is a network node such as a base station and the second radio node 120 is a UE, and the forward link is an UL when the first radio node 110 is a UE and the second radio node 120 is a network node such as a base station.

The method comprises the following actions, which actions may be taken in any suitable order. Actions that are optional are presented in dashed boxes in FIG. 2.

Action 201

According to an example scenario, a resource for communication is about to be set up between the first radio node 110 and the second radio node 120. The first radio node 110 receives reverse link reference signals from the second radio node 120.

Action 202

In order to be able to determine one or more precoders for beamforming of reference signals related to the resource for communication, the first radio node 110 requires knowing a quality value of the forward link channel based on a reverse link channel estimate. The quality value gives information on how to determine one or more first precoders. For example if the quality value is low, a precoder that yields a wider beam may be determined. That is, if the quality value is low, the reverse link channel estimate may give little information about the forward link channel, thus, a higher rank precoder may be used to precode the forward link reference signal so that a CSI report corresponding to more antenna ports is received, giving more information about the forward channel.

The first radio node 110 thus estimates a first quality value of the forward link channel based on the received reverse link reference signal. The estimated first quality value may relate to one or more out of:

A Signal to Interference and Noise Ratio (SINR) of the reverse link reference signals,
an estimated number of paths,
a strength of propagation paths from the first radio node 110 to the second radio node 120,
a speed of the second radio node 120,
a CSI measurement on the reverse link, and
an angular spread of the reverse link.

Action 203

The first radio node 110 then determines one or more first precoders of respective one or more first ranks based on the reverse link reference signal and the estimated first quality value. If the quality value is low, the rank of the first precoder may be determined to be high or a multiple set of first precoders of lower rank may be determined.

This way of determining the one or more first precoders has the advantage that a higher rank first precoder is used only when needed. Since a higher rank precoder consumes more radio resources this way determining one or more first precoders will save valuable radio resource. Traditional methods determine the rank of the first precoder based on capabilities and transmission modes which results in a fixed rank irrespectively if a lower rank would in fact be more resource effective.

In some sub embodiments, the determined first precoder is determined if the quality value is above a predetermined threshold. Otherwise, another first precoder is determined. In some such embodiments the system is a FDD system obtaining a beamforming of CSI-RS assisted by Sounding Reference Signals (SRS) received from the second radio node 120 such as e.g. being a UE. The threshold may in such embodiments be a threshold of uplink estimation quality, e.g., is UE power-limited, while in other embodiments the threshold may be a threshold on estimated number of multi-path directions to the second radio node 120. Thus in some embodiments, at least one of out of the one or more first precoders of the respective first ranks is determined to be a first precoder of a full-rank. This means that a full channel between transmit antennas and receive antennas can be estimated by the second radio node 120. In one of these embodiments, the first precoder is determined to be of full-rank when the estimated first quality value is below a threshold, otherwise the first precoder is determined to be a non-full rank-precoder.

In some embodiments, at least one out of the one or more first precoders defines a wider beamforming of first reference signal than at least one of the other one or more first precoders.

In some embodiments, any of the one or more first link reference signals and one or more second link reference signals comprise any one out of: CSI RS and Demodulation reference signals.

The provided method may hence e.g. be utilized as a method to determine whether or not beamforming for forward reference signals for CSI only will rely on FDD reciprocity for a particular UE such as the second radio node 120. The provided method hence enables the first radio node 110 such as an eNB to identify if it is worth setting up resource-expensive CSI acquisition schemes or if these resources are better to be used for other UEs. The example scenario considered here is that forward reference signals for CSI are beamformed. The beamformed forward reference signals for CSI may be CSI-RS used by the second radio node 120 to estimate CSI. The second radio node 120 reports CSI, which e.g. may comprise a recommended data transmission rank, channel quality indicator, and a data transmission precoder. The first radio node 110 may then combine the first precoder and the data transmission precoder to a so called full-dimension precoder for data transmission. A "full-dimension" precoder for data transmission may be a precoder that maps data symbols onto the transmit antennas of first radio node 110.

It is also possible that the forward link reference signals are demodulation reference signals used to demodulate data. In such scenario the first radio node determines, based on the quality value, that data transmission precoder, i.e. beamforming may be determined solely on reverse link reference signals. Hence, in such a scenario the first precoder is a precoder for demodulation reference signals and for data.

Action 204

The first radio node 110 then triggers a first transmission of one or more first forward link reference signals to the second radio node 120. The one or more first forward link reference signals are beamformed according to the determined respective one or more first precoders.

Action 205

According to some embodiments, the first radio node 110 receives from the second radio node 120, feedback related to the transmitted one or more first forward link reference signals. The feedback may or may not comprise a second quality value.

Action 206

The received feedback may be used to further improve the precoders to be used for beamforming the forward link reference signals related to the resource for communication. In some such embodiments, a second precoder may be determined to be used in a triggered beamformed second transmission of reference signals for CSI. In such embodiments, the second precoder may be an identity matrix, i.e., no beamforming, and the trigger second transmission may be a full-dimension CSI-RS transmission.

Thus, according to these embodiments the first radio node 110 determines one or more second precoders of respective one or more second ranks based on the received feedback.

In further embodiments, the determined first and second precoders may be used as initial precoder's beamforming, for differential beamforming. Differential beamforming is an interactive method to obtain an optimized narrow beamforming. The method is initialized with a wide beam of reference signals for CSI. The reported CSI is used to determine a new more narrow beamforming of the reference signals for CSI. Then new CSI is reported and the beamforming is again updated.

Action 207

According to these embodiments, when the one or more second precoders have been determined, the first radio node 110 triggers a second transmission of one or more second forward link reference signals to the second radio node 120, which one or more second forward link reference signals are beamformed according to the determined respective one or more second precoders.

In some examples a second transmission of one or more second forward link reference signals using the one or more determined second precoders is always triggered as long as enough resources are available.

Action 208

According to some further embodiments, the first radio node 110 triggers in the second radio node 120, anyone out of:

A configuration of first CSI processes associated with the respective one or more first precoders, and A configuration of second CSI processes associated with the second precoders.

This may be performed by transmitting a configuration message to second radio node 120.

An example of the method wherein the first radio node 110 is a network node such as an eNB and the second radio node 120 is a UE, comprises the following: The first radio node 110 such as a network node, e.g., an eNB, receives 201 reverse link reference signals which in this example are UL reference signals, e.g. SRS signals. The network node estimates 202 a first quality value based on the received UL reference signals. The network node further determines 203 one or more first precoders for CSI-RS based on the UL reference signals and the first quality value. Next a first transmission of beamformed reference signals for CSI such as CSI-RS is triggered 204 wherein the beamforming uses the determined one or more first precoders.

Optionally, the network node receives 205 in the UL, feedback of the first transmission of beamformed reference signals from the UE, and determines 206 one or more second precoder based on UL feedback and triggers 207 a second transmission of beamformed reference signals for CSI, said beamforming using the determined one or more second precoders.

In some examples, a second CSI-RS transmission using a determined second precoder is always triggered as long as enough resources are available.

Embodiments herein will now be further described and explained referring to the example wherein the first radio node 110 is a network node such as an eNB and the second radio node 120 is a UE. The reverse link reference signals in this example are UL reference signals.

However, the other way around is to be understood as being possible in these examples below, wherein the first radio node 110 is a UE and the second radio node 120 is a network node such as an eNB. The reverse link reference signals in this latter example are DL reference signals.

The text below is applicable to and may be combined with any suitable embodiment described above.

Selecting UE to Rely on FDD Reciprocity

The text below describes criteria for when FDD reciprocity is reliable and when it is less accurate according to some embodiments. Hence, it is discussed what the quality value may comprise.

In these embodiments the first UL reference signals, e.g. SRS, are transmitted by the second radio node 120 on an UL carrier in an FDD system. This corresponds to the receiving 201 of the reverse link reference signals from the second radio node 120.

The SRS transmission may thus be used to get good CSI for the UL-carrier. The CSI may be translated by the first radio node 120 to a DL carrier by first averaging the UL CSI over time and/or frequency and then compensating for the change in steering angle incurred by the difference in antenna spacing relative the carrier wavelength between the UL and DL carriers. However, this translation will typically only predict the statistics, i.e. the long-term properties rather than the instantaneous realizations, of the DL channel but the phase relations between the multi-path components may be uncorrelated to what is observed on the UL. Hence, in a rich scattering environment the best momentaneous precoder may be quite different on the UL and the DL, due to that some multi-path clusters may experience a fading peak on one carrier while it may experience a fading dip on another carrier.

According to embodiments herein, the first quality value of the CSI measurement on the UL-carrier may be how well this measurement predicts the optimal precoder choice on the DL. This corresponds to estimating 202 first quality value of the forward link channel being based on the received reverse link reference signal. For example, in a propagation environment with a single strong propagation path, e.g. line-of-sight, the UL channel estimate may very well predict the optimal DL precoder. In a rich scattering multi-path environment however, the UL channel estimate may provide little information about the optimal DL precoder. To quantify this, it may be referred to as the angular spread of the channel, i.e. the width of the angular range, which comprises propagation paths from the eNB to the UE. Long-term CSI, e.g. derived from UL measurements, may generally only predict that the optimal DL precoder direction lies within the angular spread of the channel. Thus, if the angular spread is large, there is a large uncertainty where the optimal precoder direction lies if only UL CSI is used.

In one embodiment, the estimated 202 first quality value is thus the angular spread of the channel. If the angular spread is large, many CSI-RS ports shall be offered to the UE so that the eNB only determines 203 a crude beam direction as the one or more first precoders, i.e. the beam patterns from the CSI-RS ports correspond to a broader beam, and the UE itself may select the a more fine precoder direction within the subspace spanned by the CSI-RS ports, i.e. the CSI-RS precoder shall be of high rank. If the angular spread of the channel is small however, the eNB determines 203 the one or more first precoders such that the number of CSI-RS ports should be kept small, e.g. just 2 ports, so that the eNB solely decides the beam direction that will be used in the subsequent data transmission with minimum additional feedback from the UE.

In one such embodiment, the angular spread of the channel is estimated 202 by performing a DFT decomposition of the UL channel estimate, which may or may not be averaged over time and/or frequency. An estimate 202 of the angular spread may be derived by calculating the ratio of magnitude of the one or two strongest DFT components compared to the total energy of the channel. The different DFT components will correspond to different physical angle of departures, given that a Uniform Linear Array (ULA) or Uniform Planar Array (UPA) is used by the eNB. If a majority of the channel energy is contained in a few DFT components, the angular spread of the channel is small and vice versa.

In another such embodiment, the angular spread of the channel is estimated 202 by averaging the UL channel estimates over time and/or frequency and performing a Singular-Value Decomposition (SVD) or Eigen-decomposition of the channel. Similarly as for the DFT decomposition, a measure of the angular spread may be calculated as the ratio of the magnitude of the one or two strongest Eigen-values or singular-values compared to the sum of the magnitude of all Eigen-values or singular-values. Eigen values are a mathematical property of a matrix that may be used to determine the strength of a beamforming vector, Eigen vector. In an alternative embodiment, the angular spread may be estimated by simply counting the number of non-zero singular values. In one such embodiment, the number of CSI-RS ports is determined by calculating how many of the singular values are larger than a specific threshold, and then beamforming each CSI-RS port with the corresponding right-singular vectors.

In one embodiment, the beamformed CSI-RS type corresponds to a LTE Class B CSI-RS with K>1, meaning that several Non-Zero Power (NZP) CSI-RS resources are configured and the UE first selects which one of the K CSI-RS resources to report CSI for by feeding back a CSI Resource Indicator (CRI) and then feeds back the corresponding CSI report for that resource comprising a PMI, RI and CQI. K is defined as the number of NZP CSI-RS resources a UE may select from when configured with Class B CSI reporting in 3GPP LTE Release 13, see TS 36.213. In this embodiment, each of the K CSI-RS resources may be beamformed using a respective right-singular vector of the time- and/or frequency-averaged UL channel estimate. The UE would then select which channel Eigen-direction that gives the best DL performance.

In another embodiment, the eNB virtualizes the antenna array into a set of "virtual subarrays" for CSI-RS transmission, so that each antenna port is transmitted from a separate virtual subarray. The size of the virtual subarray is determined by the estimated angular spread. If the angular spread is small, the eNB determines 203 the one or more first precoders such a large virtual subarray is used, and so that the beam pattern on each CSI-RS antenna port is narrow and the number of CSI-RS antenna ports is small. If the estimated angular spread is large, on the other hand, the eNB determines 203 the one or more first precoders such the subarray size is small so that beam pattern on each CSI-RS antenna port is wide, thus covering the larger angular spread, and many CSI-RS antenna ports are used. With this approach, only one NZP CSI-RS resource is needed, i.e. K=1.

In one embodiment, the eNB simply determines 203 the one or more first precoders to be a non-precoded, full-dimension CSI-RS transmission if the channel quality value is below a certain threshold, thus not utilizing the UL channel estimate at all.

Full Dimension CSI Feedback of Beamforming Vector

In other embodiments the second radio node 120 such as a UE measures on a high rank forward link such as in this example a DL signal where the UE may, for example, send the feedback related to first forward link reference signals by reporting the N-strongest Eigen values and Eigen vectors, to be received 205 by the first radio node 110. The situation in this case is similar to above, that the CSI report is uncertain with respect to the interference from other users.

Hence, in low interference e.g. low load, the report is a good predictor of the best downlink precoder. However, in an interference situation this is not true. Hence in that case the first radio node 110 first sends the first one or more forward reference signals as a CSI-RS with the first precoder to get a precoder selection, the second precoder that takes interference into account using any state of the art method for precoder selection taking interference into consideration e.g. CSI-IM symbols.

In some examples of this embodiment, the first radio node 110 such as the network node estimates the speed of the second radio node 120 such as the UE speed by correlating two or more channel estimates of the UL-RS to estimate 202 the first quality value of the forward link channel. If the UE speed is low and the UL channel comprises multiple paths, an explicit CSI report of the full DL channel based on a full-dimension CSI-RS may likely yield a considerable throughput gain compared to a narrow beamforming based on UL channel. In such example the first radio node 110 such as the network node may determine 203 several first precoders for each, or groups of the estimated paths as candidate beams and then from CSI reports determine which of the paths are valid for more first forward link reference signals such as DL reference signals in this example. The network node may also trigger 207 a second full-dimension CSI-RS transmission and receive an explicit CSI report comprising the full DL channel or DL beamforming precoder.

Reciprocity Assisted Differential Beamforming

In this embodiment the first radio node 110 such as the network node determines a first 203 and a second 206 precoder to be used to beamform the first and second forward link reference signals in this example as a first and second CSI-RS to be used in a differential beamforming framework wherein one of precoders determine a more wider beam than the other. In some such embodiments the determining of first 203 and second 206 precoders is used only to initiate the differential beamforming while in other embodiments the UL-RS are continuously used to assist the differential beamforming. In such other embodiments the determined first and second precoder may hence be determined 203, 206 based on the first and second quality value, the UL-RS as well as reported CSI precoder from the second radio node such as the UE for first and second CSI-RS. The quality in this embodiment may be the number of multi-paths, such as beam angles. For example, if the number of paths such as beam angles is large the first precoder may determine a wider beamforming covering multiple paths, e.g. average of beam angles.

Open-Loop Initial Transmission for Close Loop Feedback

Some embodiments herein are implemented when it is important to maintain low latency by using the first precoder also for a first data transmission from the first radio node 110. In this embodiment, the format of the data transmission may be adopted to the quality of the first CSI, which is the first quality value of forward link channel, based upon a first UL-transmission, which is the received 201 reverse link reference signals from second radio node 120.

In one example, the first data transmission is transmitted at full rank in relation to the first precoder. If low error rate is important, a diversity format may be used to spread the information over said full rank. In this embodiment, it is further possible to transmit Demodulation Reference Signal (DMRS) with the same first precoder and to partially or fully base the CSI measurement on the DMRS. It is also possible to include CSI-RS resource in the data transmission.

In view of the above, the transmission of DMRS using the first precoder refers to the transmission of the forward link reference signals using the first precoder.

In one example, the first data transmission is transmitted at a lower rank than the first-precoder e.g., only the best precoding-vectors are used while including CSI-RS for the full first-precoder.

Determining First and Second Quality Values

The determined quality value may be one or more out of:
Signal-to-Interference-and-Noise-Ratio (SINR) of UL-RS
Estimated number of paths
Strength of paths
UE speed: If channel estimates from consecutive reverse link reference signals such as UL-RS are highly correlated then this indicates that radio environment for a second radio node 120 such as the UE is rather stable, such as e.g. low UE speed.
The first quality value of the reverse link reference signals such as CSI measurement on the reverse link such as UL-carrier may be how well this measurement predicts the optimal precoder choice on the forward link such as DL.
The angular spread of the reverse link channel.

Figure 4:
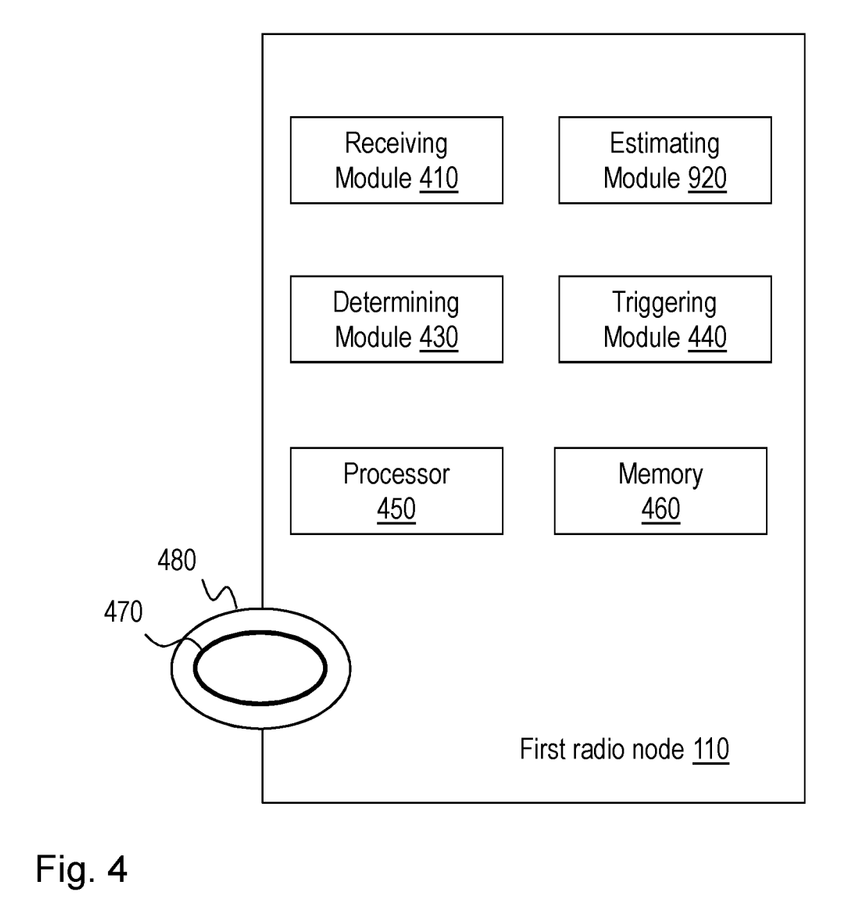
FIG. 4 is a schematic block diagram illustrating embodiments of a first radio node.

To perform the method actions for determining one or more precoders for beamforming of reference signals, the first radio node 110 may comprise the following arrangement depicted in FIG. 4. As mentioned above, the reference signals are adapted to relate to Channel State Information, CSI, of a forward link channel from the first radio node 110 to a second radio node 120.

The first radio node 110 is configured to, e.g. by means of a receiving module 410 configured to, receive reverse link reference signals from the second radio node 120.

The first radio node 110 may further be configured to, e.g. by means of the receiving module 410 configured to, receive from the second radio node 120, feedback related to the transmitted one or more first forward link reference signals.

The receiving module 410 may be comprised in a wireless receiver in the first radio node 110.

The first radio node 110 is configured to, e.g. by means of an estimating module 420 configured to, estimate a first quality value of the forward link channel based on the received reverse link reference signal.

The first quality value to be estimated may relate to one or more out of:
A Signal to Interference and Noise Ratio, SINR, of the reverse link reference signals,
an estimated number of paths,
a strength of propagation paths from the first radio node 110 to the second radio node 120, a speed of the second radio node 120, a CSI measurement on the reverse link, and an angular spread of the reverse link.

The first radio node 110 is further configured to, e.g. by means of an determining module 430 configured to, determine one or more first precoders of respective one or more first ranks based on the reverse link reference signal and the estimated first quality value. In some embodiments, at least one of out of the one or more first precoders of the respective first ranks is to be determined to be a first precoder of a full-rank. In these embodiments, the first precoder may be determined to be of full-rank when the estimated first quality value is below a threshold.

In some embodiments, at least one out of the one or more first precoders is adapted to define a wider beamforming of first reference signal than at least one of the other one or more first precoders.

The first radio node 110 may further be configured to, e.g. by means of a determining module 430 configured to, determine one or more second precoders of respective one or more second ranks based on the received feedback.

The first radio node 110 is further configured to, e.g. by means of an triggering module 440 configured to, trigger a first transmission of one or more first forward link reference signals to the second radio node 120, which one or more first forward link reference signals are to be beamformed according to the determined respective one or more first precoders.

The first radio node 110 may further be configured to, e.g. by means of an triggering module 440 configured to, trigger a second transmission of one or more second forward link reference signals to the second radio node 120, which one or more second forward link reference signals are to be beamformed according to the determined respective one or more second precoders.

In some embodiments, any of the one or more first link reference signals and one or more second link reference signals are adapted to comprise any one out of:

Channel State Information, CSI, Reference Signals, RS, and Demodulation reference signals.

In some embodiments, the first radio node 110 further is configured to trigger in the second radio node 120, anyone out of: A configuration of first CSI processes associated with the respective one or more first precoders, and a configuration of second CSI processes associated with the second precoders.

The embodiments herein may be implemented through one or more processors, such as a processor 450 in the first radio node 110 depicted in FIG. 4, together with computer program code for performing the functions and actions of the embodiments herein. The program code mentioned above may also be provided as a computer program product, for instance in the form of a data carrier carrying computer program code for performing the embodiments herein when being loaded into the first radio node 110. One such carrier may be in the form of a CD ROM disc. It is however feasible with other data carriers such as a memory stick. The computer program code may furthermore be provided as pure program code on a server and downloaded to the first radio node 110.

The first radio node 110 may further comprise a memory 460 comprising one or more memory units. The memory 460 comprises instructions executable by the processor 450.

The memory 460 is arranged to be used to store e.g. information about CSI of a forward link channel, a first quality value, precoders, data, configurations, and applications to perform the methods herein when being executed in the first radio node 110.

In some embodiments, a computer program 470 comprises instructions, which when executed by the at least one processor 450, cause the at least one processor 450 to perform actions according to any of the Actions 201-208.

In some embodiments, a carrier 480 comprises the computer program 470, wherein the carrier is one of an electronic signal, an optical signal, an electromagnetic signal, a magnetic signal, an electric signal, a radio signal, a microwave signal, or a computer-readable storage medium.

Those skilled in the art will also appreciate that the modules in the first radio node 110, described above may refer to a combination of analog and digital circuits, and/or one or more processors configured with software and/or firmware, e.g. stored in the memory 460, that when executed by the one or more processors such as the processor 450 as described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

ABBREVIATIONS

3GPP Third Generation Partnership Project
eNB Enhanced NodeB
CQI Channel-Quality Indicator
CRI CSI Resource Indicator
CRS Cell-Specific Reference Symbol
CSI Channel-State Information
CSI-IM CSI Interference Measurement
CSI-RS CSI Reference Symbol
DCI Downlink Control Information
DMRS Demodulation Reference Signal
LTE Long Term Evolution
MIMO Multiple Input Multiple Output
NZP Non-Zero Power
PMI Pre-coding Matrix Indicator
RI Rank Indicator
SVD Singular-Value Decomposition
UE User Equipment

The invention claimed is:

1. A method performed by a first radio node for determining one or more precoders for beamforming of reference signals, wherein the reference signals relate to Channel State Information (CSI) of a forward link channel from the first radio node to a second radio node, the method comprising:
   receiving a reverse link reference signal from the second radio node;
   estimating a first quality value of the forward link channel based on the reverse link reference signal;
   determining one or more first precoders of respective one or more first ranks based on the reverse link reference signal and the estimated first quality value; and
   triggering a first transmission of one or more first forward link reference signals to the second radio node, wherein the one or more first forward link reference signals are beamformed according to the respective one or more first precoders,
   wherein at least one of out of the first precoders of the respective first ranks is determined to be a first precoder of a full-rank when the estimated first quality value is below a threshold.

2. The method according to claim 1, further comprising:
   receiving from the second radio node, feedback related to the transmitted one or more first forward link reference signals;

determining one or more second precoders of respective one or more second ranks based on the feedback; and triggering a second transmission of one or more second forward link reference signals to the second radio node, wherein the one or more second forward link reference signals are beamformed according to the respective one or more second precoders.

3. The method according to claim 2, further comprising: triggering in the second radio node, any one out of:

a configuration of first CSI processes associated with the respective first precoders; and a configuration of second CSI processes associated with the second precoders.

4. The method according to claim 2, wherein any of the first link reference signals and second link reference signals comprises any one out of:

Channel State Information (CSI)-Reference Signals (RS) and Demodulation Reference Signals.

5. The method according to claim 1, wherein at least one out of the first precoders defines a wider beamforming of a reference signal than at least one of the other first precoders.

6. The method according to claim 1, wherein the estimated first quality value relates to one or more out of:

a Signal to Interference and Noise Ratio (SINR) of the reverse link reference signals, an estimated number of paths, a strength of propagation paths from the first radio node to the second radio node, a speed of the second radio node, a CSI measurement on the reverse link, and an angular spread of the reverse link.

7. A non-transitory computer readable medium storing a computer program comprising instructions, that when executed by at least one processor of a first radio node configured to determine precoders for beamforming of reference signals that relate to Channel State Information (CSI) of a forward link channel from the first radio node to a second radio node, cause the at least one processor to:

receive a reverse link reference signal from the second radio node;

estimate a first quality value of the forward link channel based on the reverse link reference signal;

determine one or more first precoders of respective one or more first ranks based on the reverse link reference signal and the estimated first quality value; and trigger a first transmission of one or more first forward link reference signals to the second radio node, wherein one or more first forward link reference signals are to be beamformed according to the determined respective one or more first precoders, wherein at least one of out of the first precoders of the respective first ranks is determined to be a first precoder of a full-rank when the estimated first quality value is below a threshold.

8. A first radio node configured for determining one or more precoders for beamforming of reference signals, wherein the reference signals are adapted to relate to Channel State Information (CSI) of a forward link channel from the first radio node to a second radio node, the first radio node comprising:

communication circuitry configured to receive reverse link reference signals from the second radio node; and processing circuitry operatively associated with the communication circuitry and configured to:

estimate a first quality value of the forward link channel based on the reverse link reference signal;

determine one or more first precoders of respective one or more first ranks based on the reverse link reference signal and the estimated first quality value; and trigger a first transmission of one or more first forward link reference signals to the second radio node, wherein the one or more first forward link reference signals are to be beamformed according to the respective one or more first precoders, wherein at least one of out of the first precoders of the respective first ranks is determined to be a first precoder of a full-rank when the estimated first quality value is below a threshold.

9. The first radio node according to claim 8, wherein the processing circuitry is configured to:

receive from the second radio node, feedback related to the transmitted one or more first forward link reference signals;

determine one or more second precoders of respective one or more second ranks based on the feedback; and trigger a second transmission of one or more second forward link reference signals to the second radio node, wherein the one or more second forward link reference signals are to be beamformed according to the respective one or more second precoders.

10. The first radio node according to claim 9, wherein the processing circuitry is configured to:

trigger in the second radio node, any one out of:

a configuration of first CSI processes associated with the respective first precoders, and a configuration of second CSI processes associated with the second precoders.

11. The first radio node according to claim 9, wherein any of the first link reference signals and second link reference signals are adapted to comprise any one out of:

Channel State Information (CSI)-Reference Signals (RS) and Demodulation Reference Signals.

12. The first radio node according to claim 8, wherein at least one out of the first precoders is adapted to define a wider beamforming of a reference signal than at least one of the other first precoders.

13. The first radio node according to claim 8, wherein the first quality value to be estimated relates to one or more out of:

a Signal to Interference and Noise Ratio (SINR) of the reverse link reference signals, an estimated number of paths, a strength of propagation paths from the first radio node to the second radio node, a speed of the second radio node, a CSI measurement on the reverse link, and an angular spread of the reverse link.

* * * * *

UNITED STATES PATENT AND TRADEMARK OFFICE
CERTIFICATE OF CORRECTION

Page 1 of 1

PATENT NO. : 10,868,599 B2
APPLICATION NO. : 16/327071
DATED : December 15, 2020
INVENTOR(S) : Jonas Fröberg Olsson et al.

It is certified that error appears in the above-identified patent and that said Letters Patent is hereby corrected as shown below:

On the Title Page

Item (87):
"(87) PCT Pub. No.: WO2018/038648
PCT Pub. Date: Mar. 1, 2019"

Should read:
-- PCT Pub. No.: WO2018/038648
PCT Pub. Date: Mar. 1, 2018 --

Signed and Sealed this
Twenty-seventh Day of July, 2021

Drew Hirshfeld
*Performing the Functions and Duties of the*
*Under Secretary of Commerce for Intellectual Property and*
*Director of the United States Patent and Trademark Office*